(12) United States Patent
Koo

(10) Patent No.: US 6,236,584 B1
(45) Date of Patent: May 22, 2001

(54) AUTOMATIC VOLTAGE CONVERSION MODULE

(75) Inventor: Bon Kwon Koo, Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/584,550

(22) Filed: Jun. 1, 2000

(30) Foreign Application Priority Data

Jun. 2, 1999 (KR) .................................. 99-20243

(51) Int. Cl.$^7$ ...................................... H02M 7/04

(52) U.S. Cl. ............................................ 363/143

(58) Field of Search ........................... 363/142, 143, 363/125, 126

(56) References Cited

U.S. PATENT DOCUMENTS

| | | | |
|---|---|---|---|
| 5,138,547 | * | 8/1992 | Swoboda .......................... 363/143 |
| 5,572,415 | * | 11/1996 | Mohan ............................. 363/61 |
| 5,793,626 | * | 8/1998 | Jiang .............................. 363/126 |
| 5,831,846 | * | 11/1998 | Jiang .............................. 363/125 |

* cited by examiner

*Primary Examiner*—Adolf Doneke Berhane
(74) *Attorney, Agent, or Firm*—Fleshner & Kim, LLP

(57) ABSTRACT

Automatic voltage conversion module including a rectifier for receiving and rectifying a utility AC power, a smoother for smoothing a voltage rectified at the rectifier, a voltage sensor for sensing the voltage from the smoother to determine an amplitude of a supplied power, and a smoothing operation selector for changing operation paths of the rectifier according to result of the determination at the voltage senor, thereby permitting a system to make a smooth and regular operation.

2 Claims, 2 Drawing Sheets

AUTOMATIC VOLTAGE CONVERSION MODULE

BACKGROUND OF THE INVENTION

1. Field of the Invention

The present invention relates to an automatic voltage conversion module, and more particularly, to an automatic voltage conversion module, in which a voltage of a utility power supplied to electric or electronic appliances, such as a washing machine, is changed to a voltage which can operate the appliances regardless of conditions of the utility power.

2. Background of the Related Art

In general, since either 110V or 220V AC voltage is supplied to each home, an electric part of home use electric/electronic appliance should be designed for both of the voltages. If an AC 220V should be supplied to a system designed for AC 110V, the system will be damaged, and, if an AC 110V should be supplied to a system designed for AC 221V, the system does not operate properly. Because of the above reason, a change over switch is provided to the electric part, so that the user can match to a supplied voltage for a normal operation of the appliance. However, if the user mismatches the change over switch from overlooking, the foregoing malfunction of the appliance will occur. Therefore, a device is needed that can sense an incoming voltage, and make an automatic change over. FIG. 1 illustrates a circuit of an electric part used for a related art washing machine. As respective modules in the washing machine are designed for DC 311V, the electric part should change the voltage before supply to the modules.

Referring to FIG. 1, the electric part is provided with a utility power source 1, a power switch 2 for supplying or cutting off the power to a system depending on a users selection, a bridge rectifier 3 for rectifying an AC current from the utility power 1 into a DC current, a smoother 4 having smoothing capacitors C1 and C2 and resistors R1 and R2 for smoothing the rectified current at the bridge rectifier 3 to provide a 311V DC voltage, and a motor driver 5 for receiving an output of the smoother 4 and driving a washing motor in the washing machine. The smoother 4 has two identical capacitors C1 and C2 connected in series, and two identical resistors R1 and R2 connected to the capacitors C1 and C2 in parallel, respectively.

The operation of the aforementioned related art electric part will be explained.

When the user turns on the power switch 2 for putting the washing machine into operation, the 220V AC power from the utility power source 1 is provided to the bridge rectifier 3. The bridge rectifier 3 rectifies a current as paths of the current alternates for a positive half cycle and a negative half cycle, and the rectified current is provided to the smoother 4, where the current is smoothed through the smoothing capacitors C1 and C2, to provide a DC current. In this instance, the smoothed DC current has a voltage of $\sqrt{2} \cdot 220 = 311V$. During the positive half cycle in the above operation, a closed circuit is formed in an order of the utility power source 1→the first diode D1→the first capacitor C1→the second capacitor C2→the third diode D3→the utility power source 1. And, during the negative half cycle in the above operation, a closed circuit is formed in an order of the utility power source 1→the fourth diode D4→the first capacitor C1→the second capacitor C2→the second diode D2→the utility power source 1. At the end, since the DC 311V is charged to the first capacitor C1 and the second capacitor C2 continuously, to supply the DC 311V to the motor driver 5 continuously, the washing motor(not shown) can make a regular operation.

However, if a 110V is supplied to the utility power source 1 in the related art electric part, the system can not be operate properly. That is, since the electric part is designed to provide the 311V only when an AC 220V is supplied, in a case when 110V is supplied to the electric part, to provide a DC voltage of $\sqrt{2} \cdot 110 = 155.5V$ through the smoother 4, the system does not operate properly. If a change over switch is provided for solving the above problem, a separate circuit for changing an external low voltage to a high voltage before supply to the system is required.

SUMMARY OF THE INVENTION

Accordingly, the present invention is directed to an automatic voltage conversion module that substantially obviates one or more of the problems due to limitations and disadvantages of the related art.

An object of the present invention is to provide an automatic voltage conversion module, in which a voltage of a utility power is sensed, changed into a voltage required for a system automatically and supplied to the system, for smooth and regular operation of the system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the automatic voltage conversion module includes a rectifier for receiving and rectifying a utility AC power, a smoother for smoothing a voltage rectified at the rectifier, a voltage sensor for sensing the voltage from the smoother to determine an amplitude of a supplied power, and a smoothing operation selector for changing operation paths of the rectifier according to result of the determination at the voltage senor.

The smoother includes a first, and a second capacitors of the same capacitances connected in series, and the smoothing operation selector includes a switching device connected between a common contact point of the first and the second capacitors and an output terminal on the rectifier.

The voltage sensor includes a third and a fourth voltage dividing resistors connected in series for dividing the voltage from the smoother, and a microcomputer for comparing the divided voltage from the third and fourth voltage dividing resistors to a reference voltage, to determine an amplitude of the utility power, to fix operation of the smoothing operation selector according to the amplitude of the utility power.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
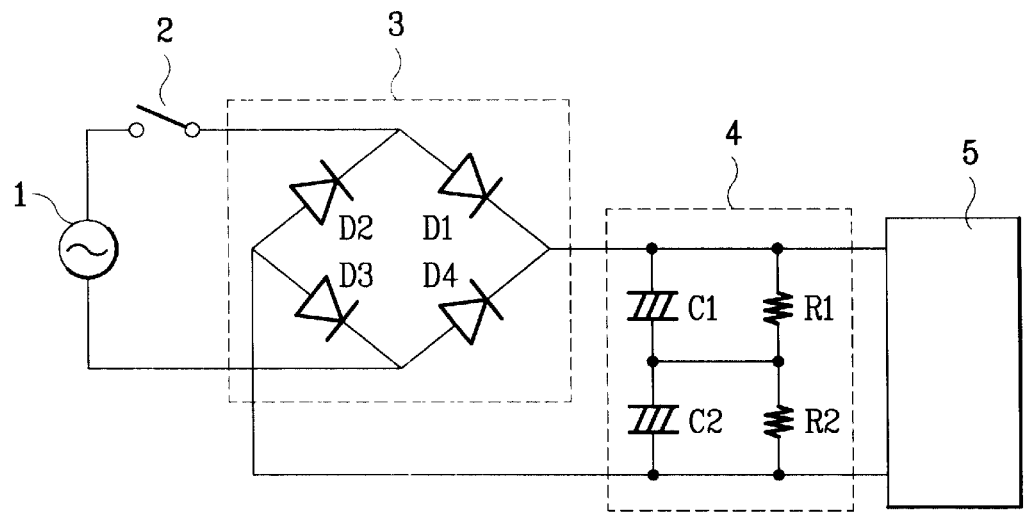
FIG. 1 illustrates a circuit of an electric part for a related art washing machine.
Figure 2:
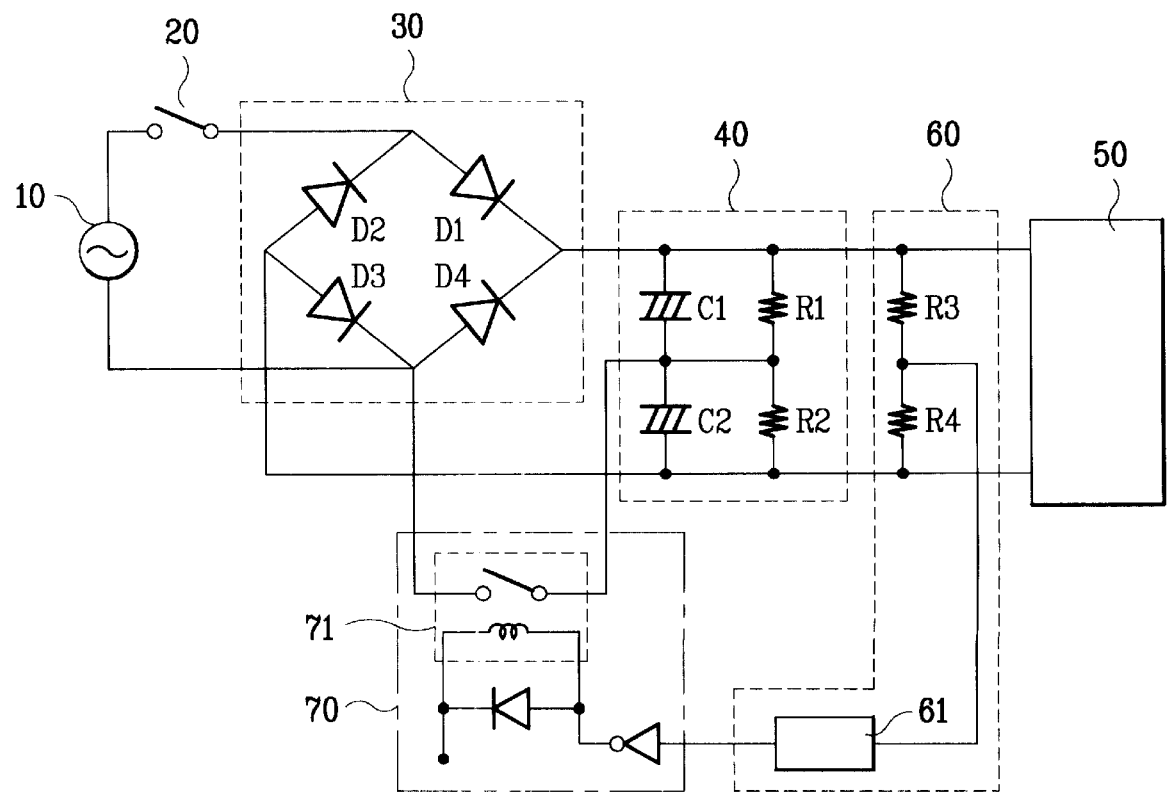
FIG. 2 illustrates a circuit of an automatic voltage conversion module in accordance with a preferred embodiment of the present invention; and, FIG. 3 illustrates waveforms for explaining operation of an automatic voltage conversion module in accordance with a preferred embodiment of the present invention.

Reference will now be made in detail to the preferred embodiments of the present invention, examples of which are illustrated in the accompanying drawings. FIG. 2 illustrates a circuit of an automatic voltage conversion module in accordance with a preferred embodiment of the present invention.

Referring to FIG. 2, the automatic voltage conversion module in accordance with a preferred embodiment of the present invention includes a utility power source 10 for providing an 110V or 220V AC power, a power switch 20 for switching the utility power by a user's selection, a rectifier 30 for rectifying the utility power, a smoother 40 for smoothing the power rectified at the rectifier 30, to provide a DC power, a voltage sensor 60 for sensing a voltage of the DC power from the smoother 40, a smoothing operation selector 70 for changing operation paths of the rectifier 30 and the smoother 40 according to a voltage from the voltage sensor 60. The unexplained reference numeral 50 is a motor driver 50 for driving motor by a voltage from the smoother 40. The power switch 20 is projected from a case of the washing machine, so that the user can select turn on/off. The rectifier 30 has four diodes D1, D2, D3, and D4 connected in a bridge form, and the smoother 40 has a first, and a second capacitors C1 and C2 of the same capacitances connected in series, and a first, and a second resistors R1 and R2 of the same resistances connected to the first and second capacitors C1 and C2 in parallel, respectively. And, the voltage sensor 60 has a third and a fourth resistors R3 and R4 connected in series for dividing the voltage from the smoother 40, and a microcomputer 61 for comparing the divided voltage from the third and fourth resistors R3 and R4 to a reference voltage, to determine whether the utility power 10 is equal to 110V or 220V, to fix operation of the smoothing operation selector 70 according to a result of the determination. The smoothing operation selector 70, which is preferably a switching device connected between a common contact point of the first and second capacitors C1 and C2 in the smoother 40 and an output terminal on the rectifier 30, has a relay 71, for operating as a voltage doubler to provide 311V when an 110V is suppled to the utility power source 10.

Figure 3:
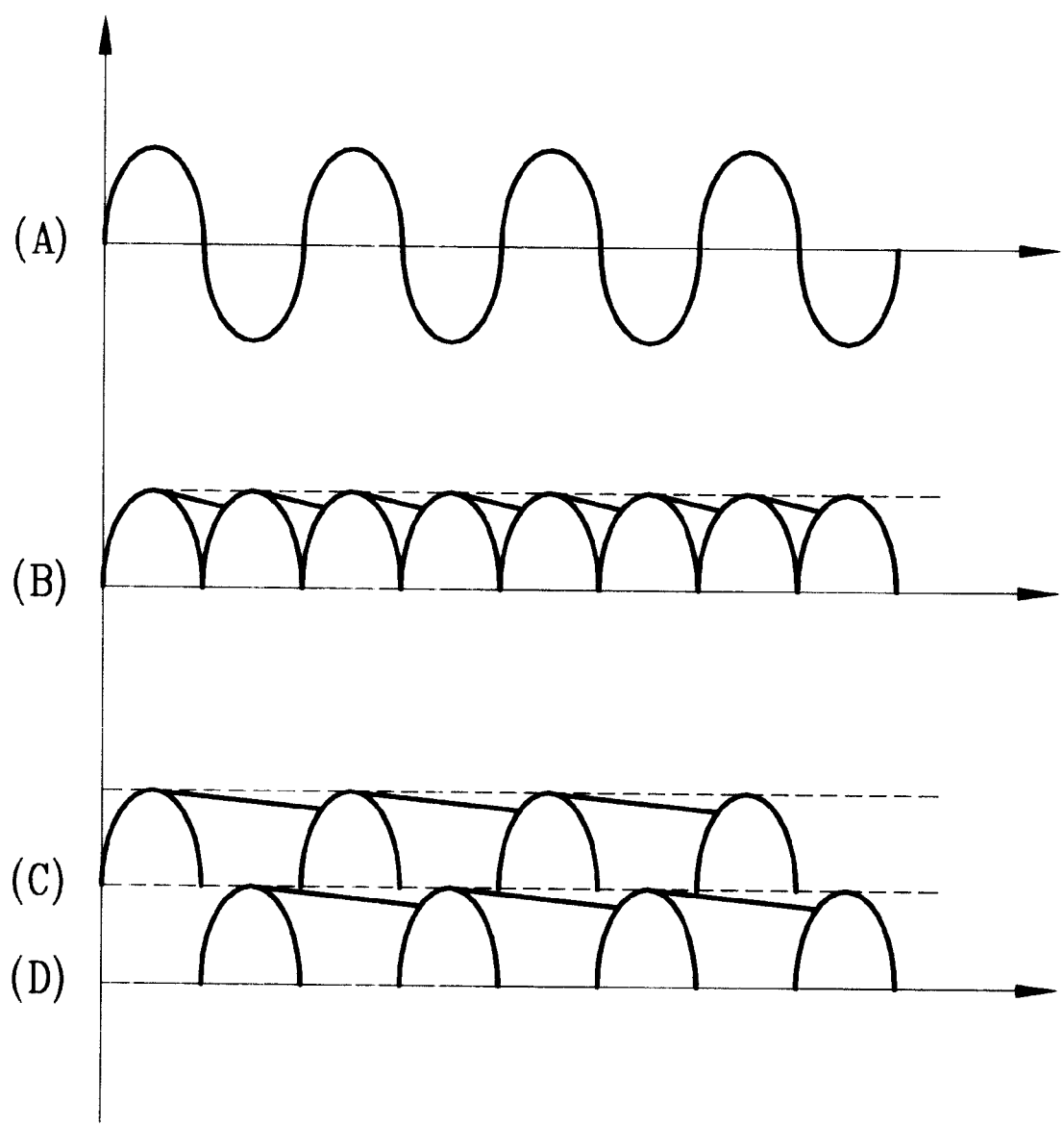

The operation of the automatic voltage conversion module in accordance with a preferred embodiment of the present invention will be explained. FIG. 3 illustrates waveforms for explaining operation of an automatic voltage conversion module in accordance with a preferred embodiment of the present invention.

When the user turns on the power switch 20 to put the washing machine into operation, as shown in FIG. 3A, the utility power source 10 provides a sinusoidal AC power to the rectifier 30, the rectifier 30 rectifies the AC power, and the smoother 40 smooths the rectified AC power and provides to the motor driver 50. At a moment the above operation is made, the voltage sensor 60 divides a voltage of the power through the third and fourth resistors R3 and R4, and the microcomputer 61 compares the divided voltage to a reference voltage, to determine whether the utility power is 110V or 220V. If the utility power is determined to be 110V, the microcomputer 61 turns on the relay 71 in the smoothing operation selector 70, and, if the utility power is determined to be 220V, the microcomputer 61 turns off the relay 71 in the smoothing operation selector 70. Thus, since the relay 71 is turned off iis a case when a 220V is supplied from the utility power source 10, an operation the same with the related art is made, to provide a DC voltage of $\sqrt{2}\cdot 220 = 310V$ with a voltage waveform as shown in FIG. 3B from the smoother 40. On the other hand, if a 110V is provided from the utility power source 10, the microcomputer 61 provides a control signal, to turn on the relay 71 in the smoothing operation selector 70. Accordingly, during a positive(+) half cycle, a closed circuit is formed in an order of the utility power source 10→the first diode D1→the first capacitor C1→the relay 71→the utility power source 10, to charge a DC voltage of $\sqrt{2}\cdot 110 = 155.5$ V with a voltage waveform as shown in FIG. 3C to the first capacitor C1. And, during a negative(−) half cycle, a closed circuit is formed in an order of the utility power source 10→the relay 71→the second capacitor C2→the second diode D2→the utility power source 10, to charge a DC voltage of $\sqrt{2}\cdot 110 = 155.5V$ with a voltage waveform as shown in FIG. 3D to the second capacitor C2, too. According to the above operation, a function identical to a voltage doubler is made at the smoother 40, to provide a sum of the voltages of the first and second capacitors C1 and C2, i.e., a DC voltage of 2×155.5=311V. At the end, the automatic voltage conversion module in accordance with a preferred embodiment of the present invention can supply a DC 311V to the motor driver 50 continuously, to make a regular operation of the washing motor(not shown), regardless of the power supplied from the utility power source 10 being AC 110V or AC 220V.

As has been explained, the automatic voltage conversion module of the present invention can prevent system damage and improper operation of the system by changing operation of the smoother depending on supplied voltage being 110V or 220V, to provide a 311V to the system.

And, because the user's selection of the input voltage is required no more, and a convenience of use can be enhanced.

It will be apparent to those skilled in the art that various modifications and variations can be made in the automatic voltage conversion module of the present invention without departing from the spirit or scope of the invention. Thus, it is intended that the present invention cover the modifications and variations of this invention provided they come within the scope of the appended claims and their equivalents.

What is claimed is:

1. An automatic voltage conversion module comprising:

a rectifier for rectifying an external utility AC power;

a smoother having first and second capacitors connected in series, for smoothing a voltage rectified at the rectifier;

a voltage sensor having first and second voltage dividing resistors connected in series for dividing the voltage from the smoother and a micro-computer for determining an amplitude of the utility AC power by comparing the divided DC voltage from the first and second voltage dividing resistors to a reference voltage and for outputting a signal corresponding to the amplitude of the utility AC power; and a smoothing operation selector having a switching device connected between an output terminal of the rectifier and a contact point of the first and second capacitors of the smoother for changing a smoothing path of the smoother according to the signal from the microcomputer, to convert the utility AC power to a predetermined voltage.

2. The automatic voltage conversion module of claim 1, wherein the smoother includes first and second smoothing resistors respectively connected in parallel with the first and second capacitors, and wherein the voltage sensor is coupled in parallel with the smoother.

* * * * *